Figure 1:
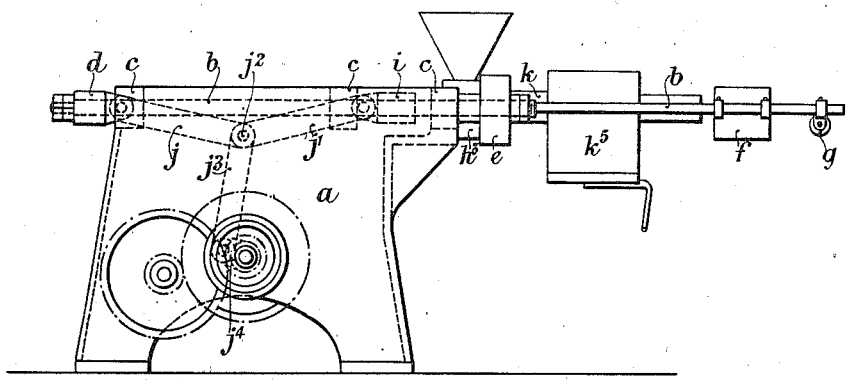

T. GARE.
METHOD OF MANUFACTURING RUBBER ARTICLES.
APPLICATION FILED AUG. 13, 1910.

1,163,525.

Patented Dec. 7, 1915.

3 SHEETS—SHEET 1.

Witnesses:

Inventor
Thomas Gare
By James L. Norris

T. GARE.
METHOD OF MANUFACTURING RUBBER ARTICLES.
APPLICATION FILED AUG. 13, 1910.

1,163,525.

Patented Dec. 7, 1915.
3 SHEETS—SHEET 2.

Witnesses:

Inventor
Thomas Gare
By James L. Norris

T. GARE.
METHOD OF MANUFACTURING RUBBER ARTICLES.
APPLICATION FILED AUG. 13, 1910.

1,163,525.

Patented Dec. 7, 1915.
3 SHEETS—SHEET 3.

FIG. 9.

FIG. 10.

Witnesses:

Inventor
Thomas Gare
By
James L. Norris, Jr.
Atty

UNITED STATES PATENT OFFICE.

THOMAS GARE, OF NEW BRIGHTON, ENGLAND.

METHOD OF MANUFACTURING RUBBER ARTICLES.

1,163,525.  Specification of Letters Patent.  Patented Dec. 7, 1915.

Application filed August 13, 1910. Serial No. 576,965.

*To all whom it may concern:*

Be it known that I, THOMAS GARE, subject of the King of Great Britain, residing at Bramble Beach, Warren Drive, New Brighton, in the county of Chester, England, engineer, have invented certain new and useful Improvements Relating to the Method of Manufacturing Rubber Articles, of which the following is a specification.

My invention relates to the manufacture, molding and remolding of india-rubber goods according to the process described and claimed in my prior Patent 967,751, granted Aug. 16, 1910, and it has for its object certain improvements in the method of carrying the process into effect and in the means for producing by the process described in the said specification articles made from india rubber such as solid or tubular tires, disks or the like, by a continuous progression through a cylindrical or tubular mold of suitable section.

Prior to the date of my application Serial No. 441,643, filed July 2, 1908, experience had shown that in practice powdered rubber, such as is preferably employed in the said process, was not amenable to uniform compression in a cylinder by means of a piston, owing to the tendency of the portion nearest the piston to adhere to the cylinder, while if small quantities were compressed at each stroke it was difficult if not impossible in practice to get each successive charge to unite properly with its neighbor, and consequently to produce by this means a continuous length of manufactured rubber.

I have since discovered that if, the powdered rubber is delivered to the mouth of a tubular mold and is packed into the mold in small quantities and compressed therein against the previous charge by a reciprocating ram working into and out of the open end of the mold, the difficulties heretofore experienced are overcome and a satisfactory continuous length of rubber can be manufactured.

According to this invention, I employ a reciprocating ram working into and out of a tubular mold and arranged to drive a small quantity of powdered rubber into said mold at each stroke and compress it so as to free it from air, and simultaneously produce an intermittent progression of the compressed rubber through the mold, a part of which is heated as described in my application above identified.

In order to insure that each successive charge will with greater certainty unite properly with its fellow, I preferably provide means whereby the adjacent surfaces of each charge are rendered rough or broken so as to "key" well to each other.

Figure 2:
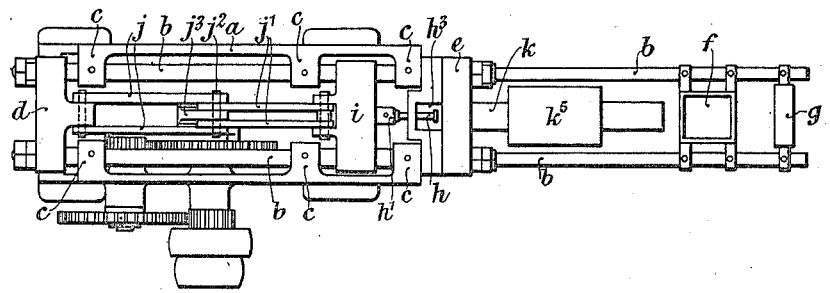
Figure 3:
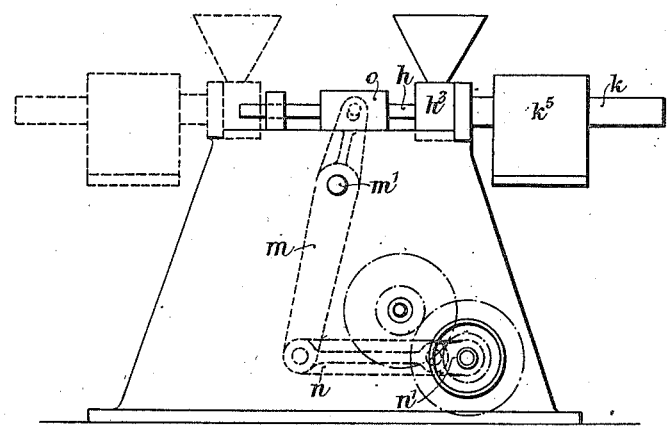
Figure 8:
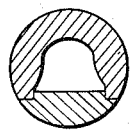

In the accompanying drawings, Figure 1 is an elevation and Fig. 2 is a plan of a machine for making continuous lengths of rubber according to my invention. Fig. 3 is a diagrammatic side view of a modification; Figs. 4, 5, 6, and 7, are sectional detail views illustrating different rams and molds; Fig. 8 is a section of a mold drawn to a larger scale; Fig. 9 is a sectional view of a portion of a machine for making boot heels, or the like, in continuous succession and Fig. 10 is a section of Fig. 9 on the line A—B.

Figure 4:
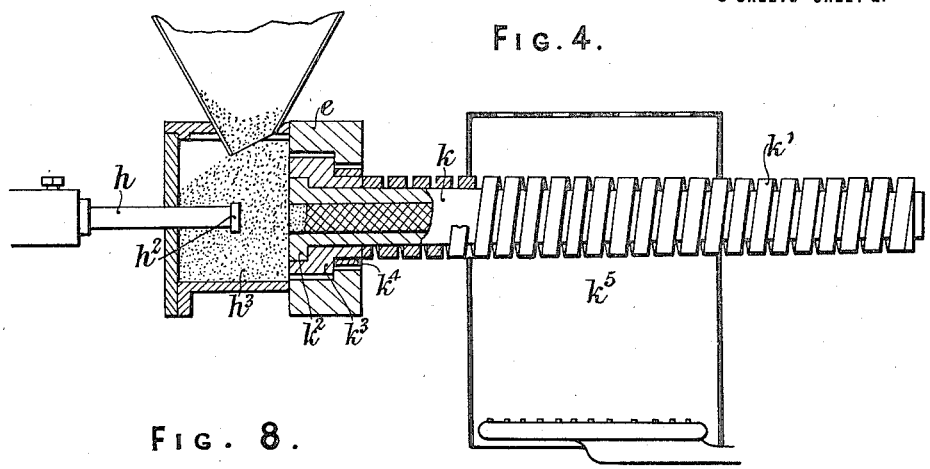

Referring to Figs. 1, 2 and 4, $a$ is a suitable supporting frame provided with horizontal carrier bars $b$ or other suitable support for the mold and ram. In the arrangement shown, bars $b$ are carried by lugs $c$ in which they are adjustably fixed, a crosshead $d$ being adjustably fixed at one end of said bars and a crosshead $e$ being removably fixed to said bars just beyond the frame $a$, the outwardly extending parts of the bars $b$ being of reduced diameter and adapted to support the chalk box $f$ and guiding roller $g$. The ram $h$ is removably fixed to a bar $h'$ which is fixed to the sliding crosshead $i$, and the mold $k$ is removably fixed in or to the crosshead $e$. The motion imparted to the ram is preferably such that the forcing stroke proceeds rapidly at first and gradually slows down during the compression and driving forward of the rubber charges, and this motion may be conveniently obtained by the well-known toggle motion shown. Links $j$ and $j'$ are pivoted at $j^2$ to each other and to one end of a connecting rod $j^3$ and are pivoted respectively to the crosshead $d$ and sliding crosshead $i$, the connecting rod $j^3$ being operated by a crank $j^4$ and suitable power gearing. In Fig. 4 the ram and mold are designed for the manufacture of solid cab tire in long lengths, the ram head $h^2$ being approximately of the same cross-sectional shape and size as the interior of the mold and being preferably nicked on its edges to allow the air to escape during compression. The powdered rubber is supplied from a hopper to a feeding chamber $h^3$, so that the ram on its forcing stroke carries forward a portion of the powder and forces a small quantity into the mold $k$, where the powder becomes highly compressed and freed from air, and when so compressed the resistance offered by the compressed rubber already in the mold is overcome and the compressed rubber is driven forward a short distance. It will be noticed that the feeding chamber $h^3$ is of comparatively large dimensions, and is so designed to avoid any checking of the ram in its to and fro movements within the chamber.

It is obvious that the amount of compression will be governed by the length of the mold, and the quantity of rubber compressed at each stroke to a great extent by the distance the piston is withdrawn from the mouth of the mold.

The mold is preferably formed in two parts as shown in Fig. 8, where the design is of somewhat irregular shape, the two parts being held in position by a metal coil $k'$ which is forced over the slightly tapered exterior of the mold. The mold is preferably formed with a flange $k^2$ which is countersunk within a stepped collar $k^3$ mounted in the crosshead $e$, a strengthening ring $k^4$ being provided on the collar $k^3$. The mold is accurately centered with respect to the ram and is held in place by set screws or other suitable means, while the flange and collar serve to resist the heavy thrust of the ram.

$k^5$ is the heating chamber.

Figure 5:
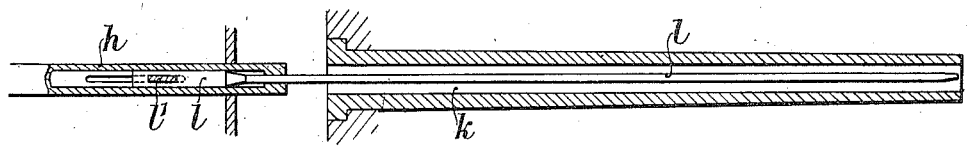
Figure 6:
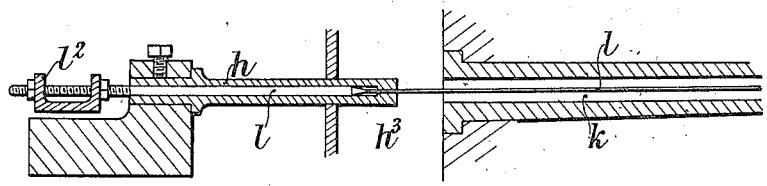

In the manufacture of tubes from powdered rubber, the ram $h$ is formed tubular and fits and slides upon a fixed core $l$ which is reduced in diameter, as shown in Figs. 5 and 6, at that part which is located within the mold $k$. The core may be fixed by a cross cotter or key $l'$ passing through a slot in the ram, where the diameter of core will permit, or by and to a cross bar $l^2$ Fig. 6 where the diameter of the core is small.

Figure 7:
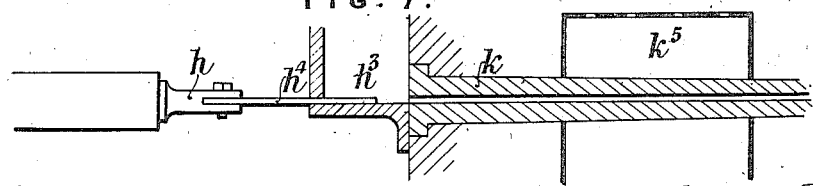

Fig. 7 shows a ram mold for making flat or sheet rubber, the ram consisting of a plate or flat bar $h^4$ detachably fixed to two or more rams $h$ which are mounted in a single sliding crosshead or are otherwise simultaneously operated.

The face of the ram or ram head is preferably cut with cross lines or similarly roughened so that in use a number of grains of rubber powder adhere thereto and assist in breaking up the surface of each compressed charge.

It will be understood that a plurality of rams and molds may be arranged side by side, operated by a single sliding crosshead, or its equivalent, and drawing their supply of powdered rubber from a common feeding chamber; or said rams may be operated by separate crossheads, or their equivalents, and arranged so that their compressing moments will not synchronize.

In Fig. 3 a modification is shown in which the movement of the ram is obtained from a rocking lever $m$ pivoted at $m'$ and connected by a link $n$ to a crank $n'$ rotated by suitable mechanism. The upper end of the lever $m$ is arranged to reciprocate a slide block $o$ which is suitably guided and which carries the ram stem $h$. This arrangement permits of utilizing the backward stroke as well as the forward stroke, by providing a duplicate ram, mold and other fittings at the opposite end, as indicated by the dotted lines.

It will be understood that the apparatus hereinbefore described may be arranged to work vertically and at any desired angle instead of horizontally.

In the manufacture of small articles such as boot heels I provide means for feeding to the mold plates of suitable thickness and shape between which the rubber is compressed in the mold and freed from air; these plates may be in the nature of matrices or dies to mold or shape the face or faces of the compressed rubber. An example of an apparatus for this purpose is shown in Figs. 9 and 10. The plates $p$ are stored in a suitable reservoir $p'$ and are driven out one at a time by a sliding bar $r$ which is operated at the proper moment by a connection ($r'$) with a suitable moving part of the machine. The plates fall down a chute $s$ and are located and guided in accurate position by the rod $s'$ and ribs $s^2$ in the feeding chamber $h^3$, and the powdered rubber is delivered to the chamber $h^3$ at predetermined intervals and in suitable quantity so that as the ram $h$ moves forward a quantity of rubber powder is forced into the mold $k$, followed by the plate $p$, and freed from air by compression between the last plate of the series already in the mold and that just introduced, the final movement of the ram causing the whole of the plates and compressed rubber disks to drive forward a distance equal to the combined thicknesses of a plate and a rubber disk.

Claim:

A method of manufacturing articles from powdered waste rubber in continuous lengths which consists of the following successive steps of operations, delivering the powdered waste rubber in a loose dry cold state to the open end of a tubular mold of uniform bore and the required sectional shape, progressively ramming lineally into the said mold small charges of the said loose, dry, cold rubber powder to highly compress and free same from air while dry and cold to form a dense compact mass, subjecting the said highly compressed dry, cold mass to a high temperature which fuses it to a homogeneous body and retaining the said body in the mold until sufficiently cool to keep its shape and prevent deterioration, the said loose, dry, cold rubber powder being rammed into the mold in quantities proportionate to the time required for the fusion and cooling thereof, and the said dry, cold compressed mass forming an abutment for the longitudinal expansion of the said fused body to progressively force the said body out of the mold as a finished article.

In testimony whereof I have hereunto set my hand in presence of two subscribing witnesses.

THOMAS GARE.

Witnesses:
GEORGE C. DOWNING,
WALTER J. SKERTEN.